United States Patent [19]

Ohno

[11] Patent Number: 5,252,268
[45] Date of Patent: Oct. 12, 1993

[54] METHOD OF CONTROLLING EXTRUSION OF MULTILAYER PARISON

[75] Inventor: Yoshitaka Ohno, Kanagawa, Japan

[73] Assignee: The Japan Steel Works, Ltd., Tokyo, Japan

[21] Appl. No.: 856,719

[22] Filed: Mar. 24, 1992

[30] Foreign Application Priority Data

Apr. 15, 1991 [JP] Japan .................. 3-109826

[51] Int. Cl.$^5$ .......................................... B29C 47/92
[52] U.S. Cl. .......................... 264/40.7; 264/40.1; 264/40.5; 264/515; 264/173; 425/133.1; 425/145; 425/146; 425/149; 425/170
[58] Field of Search ............... 264/40.1, 40.5, 40.7, 264/515, 173, 541; 425/133.1, 146, 141, 467, 462, 131.1, 532, 381, 149, 170, 150, 145

[56] References Cited

U.S. PATENT DOCUMENTS

| | | | |
|---|---|---|---|
| 4,717,326 | 1/1988 | Motonaga et al. | 425/467 |
| 4,867,664 | 9/1989 | Fukuhara | 264/515 |
| 4,978,290 | 12/1990 | Fukuhara | 425/133.1 |
| 5,004,578 | 4/1991 | Eiselen | 264/515 |
| 5,071,604 | 12/1991 | Tsujikura et al. | 264/40.7 |
| 5,098,274 | 3/1992 | Kristnakumar et al. | 425/133.1 |
| 5,110,519 | 5/1992 | Daubenbuchel et al. | 264/40.5 |

FOREIGN PATENT DOCUMENTS

| | | | |
|---|---|---|---|
| 57-75825 | 5/1982 | Japan | 425/532 |
| 62-99115 | 5/1987 | Japan | 425/133.1 |
| 63-262211 | 10/1988 | Japan | 425/131.1 |

Primary Examiner—Jeffery Thurlow
Attorney, Agent, or Firm—Sughrue, Mion, Zinn, Macpeak & Seas

[57] ABSTRACT

A method of controlling the extrusion of a multilayer parison so that the injection pressure for an auxiliary resin and that for an adhesive do not act on the annular fluid passages while a main resin, an auxiliary resin and an adhesive are stored in a main resin accumulator, an auxiliary resin accumulator and adhesive accumulators, respectively. The injecting pressure difference between each pair of auxiliary resins and the adhesive is maintained within a prescribed range and the injection of the resins and the adhesive from the accumulators is terminated simultaneously for all the materials.

6 Claims, 3 Drawing Sheets

METHOD OF CONTROLLING EXTRUSION OF MULTILAYER PARISON

BACKGROUND OF THE INVENTION

The present invention relates to a method of controlling the extrusion of a multilayer parison.

A method of blow molding is used to manufacture a hollow container made of a resin. In manufacturing such a container, a parison is injected in a die, and a pressurized gas is then blown into the parison to thereby form the container having a shape corresponding to that of the cavity of the die.

Japan Patent Application (OPI) No. 99115/87 (the term "OPI" as used herein means "unexamined published application") discloses a multilayer parison extruder in which an annular member is concentrically provided in an annular passage through which a main resin flows. An auxiliary resin is injected from one or more annular nozzles of the annular member. Each of the nozzles is provided with a material inlet port. Different materials including the main and the auxiliary resins are injected from the injectors of the extruder so that the materials are stored in the accumulators of the extruder, respectively. The material inlet ports for the nozzles are connected to the accumulators. The accumulators are activated to force the materials through the annular passage and the annular nozzles so that the materials constitute a multilayer parison as they are extruded by the extruder. For example, the multilayer parison consists of innermost and outermost layers of the main resin which is a high-density polyethylene having a good molding property but which is permeable to gasoline, a central layer of the auxiliary resin which is a nylon resin and which is impermeable to gasoline, and inner and outer intermediate layers consisting of an adhesive for conjoining the central layer to the innermost and the outermost layers. Thus, a gasoline tank is made from the parison in the conventional methods of blow molding.

However, there is a problem in that the central layer of the auxiliary resin is likely to be cut off halfway or to expand forming an expansion $20c_1$, as shown in FIG. 5. More specifically, a pressure difference exists between the inner and the outer intermediate layers of the adhesive while the accumulators are activated to force the materials therefrom. Thus, the central layer of the auxiliary resin is pushed from the higher-pressure layer of the adhesive toward the lower-pressure layer of the adhesive so that the central layer is deformed so as to decrease the thickness to an unacceptable low value, or in an extreme case, to zero. Such a phenomenon can also happen if a pressure difference exists between the innermost and the outermost layers of the main resin. If the pressure difference is 20 kg/cm² or more and the parison is for a motor vehicle's gasoline tank, the central layer of the auxiliary resin is cut off or ruptured.

Further, since the nylon resin for the central layer is higher in viscosity than the other materials, the pressure drop of the nylon resin lags behind that of the other materials at the end of the injection of the resin and the other materials from the accumulators into the annular passage and the annular nozzles even if the injection is stopped simultaneously for all of the resin and the other materials. Therefore, it is likely that only the nylon resin will continue to be injected from an auxiliary resin passage after the injection of all the materials has been terminated so that the central layer of the nylon resin expands to form the expansion $20c_1$. If the parison has such an expansion, it is defective because it does not have a prescribed thickness ratio at the area of expansion. Injection pressure much lower than the injection pressure which acts on each material when the accumulator is put in action to push out the material acts from the injector to the material at an annular outlet port while the material pushed out from the injector is stored in the accumulator after the previous pushing-out of the material from the accumulator. Besides, the injection pressure for the nylon resin, which is higher in viscosity than the other materials, needs to be higher than the injection pressure for the other materials. Therefore, only the nylon resin is likely to be forced out in a small quantity from the annular outlet port during the storage of the resin in the accumulator so as to create a similar expansion near the port. A multilayer parison having such an expansion, is defective since it does not have the prescribed thickness ratio at the expansion. This is also a problem.

SUMMARY OF THE INVENTION

The present invention was made in order to solve the above mentioned problems. Accordingly, it is an object of the invention to provide a method of controlling the extrusion of a multilayer parison so that the injection pressure for an auxiliary resin and that for an adhesive do not act on the annular fluid passages while a main resin, the auxiliary resin and the adhesive are stored in a main resin accumulator, an auxiliary resin accumulator and adhesive accumulators, respectively; the injecting pressure difference between each pair of resins and the adhesive is kept within a prescribed range; and the injection of the resins and the adhesive from the accumulators is terminated simultaneously for all the materials.

In the extrusion of the multilayer parison, the main and the auxiliary resins, and the adhesive are injected from three extrudors so that the resins and the adhesive are respectively stored in the accumulators. The main resin is then injected from the main resin accumulator into the outermost and the innermost annular fluid passages which are two of the five annular fluid passages provided in a cylinder and which are concentric to each other. The auxiliary resin is injected from the auxiliary resin accumulator into the central annular fluid passage which is another of the five annular fluid passages. The adhesive is injected from the adhesive accumulators into the inner and the outer intermediate fluid passages which are final two of the five annular fluid passages. The main and the auxiliary resins and the adhesive are forced through or along an annular outlet port so that the resins and the adhesive overlay each other to constitute the multilayer parison as it is extruded from the cylinder.

The method is characterized in that connecting fluid passages for connecting the auxiliary resin accumulator and the adhesive accumulator to the central annular fluid passage and the inner and the outer intermediate fluid passages are closed while the main and the auxiliary resins, and the adhesive are stored in the main and the auxiliary resin accumulators and the adhesive accumulators. The connecting fluid passages are opened when the main and the auxiliary resins and the adhesive begin to be injected from the accumulators into the annular fluid passages in a preset order and timing so that the resins and the adhesive are simultaneously forced through or along the annular outlet port. The pressure of the resins and the adhesive in the annular fluid passages is regulated so that the pressure difference between each pair of the resins and the adhesive at the annular outlet port is not larger than a prescribed value while the resins and the adhesive are forced from the accumulators into the annular fluid passages. Further, the timing of the termination of the injection of the main resin from the main resin accumulator, and the timing of the closing of the connecting fluid passages for the auxiliary resin and the adhesive are regulated so that the injection of the main resin from the main resin accumulator, of the auxiliary resin from the auxiliary resin accumulator and of the adhesive from the adhesive accumulators are simultaneously ended.

Since the connecting fluid passage for connecting the auxiliary resin accumulator to the central annular fluid passage and the connecting fluid passages for connecting the adhesive accumulators to the inner and the outer intermediate annular fluid passages are closed while the main and the auxiliary resins and the adhesive are stored in the accumulators, the auxiliary resin and the adhesive are prevented from forming expansions at the annular outlet port. Valves for opening and closing the connecting fluid passages are set at prescribed degrees of opening at the start of the injection of the resins and the adhesive from the accumulators into the annular fluid passages, and the accumulators are activated in a prescribed order and timing to force the resins and the adhesive therefrom into the annular fluid passages. Therefore, the injection of the main resin, the auxiliary resin and the adhesive are simultaneously started. The resins and the adhesive are forced through the annular fluid passages under pressure dependent on the pressure in the accumulators and the degrees of opening of the valves, so that the pressure difference between each pair of the resins and the adhesive in the annular fluid passages is sufficiently small to prevent the resins and the adhesive from being cut off or forming the expansions. The termination of the injection of the main resin and the closing of the connecting fluid passages for the auxiliary resin and the adhesive are performed in a prescribed order and timing at the end of the injection of the materials from the accumulators so as to prevent the materials from simultaneously flowing out to form the expansions. The multilayer parison is thus prevented from being extruded in a manner that would result in a defective thickness ratio. In other words, every multilayer parison is extruded to be uniform in thickness ratio.

DETAILED DESCRIPTION OF EXEMPLARY EMBODIMENT

An embodiment of the present invention is hereafter described in detail with reference to the drawings attached hereto. The embodiment is a method of controlling the extrusion of a multilayer parison.

Figure 1:
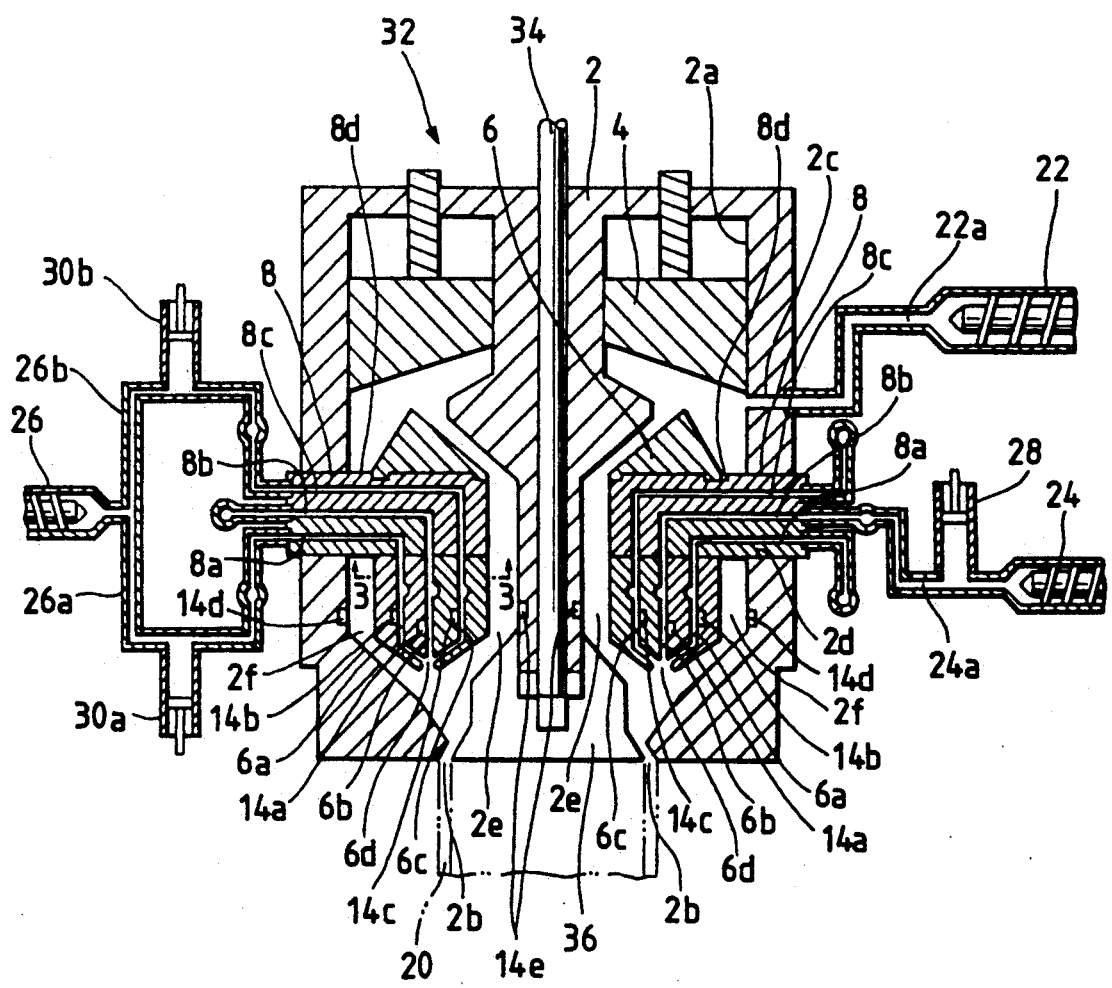
FIG. 1 is a longitudinal sectional view of a major portion of a blow molding machine for practicing a multilayer parison extrusion controlling method which is an embodiment of the present invention.
Figure 2:
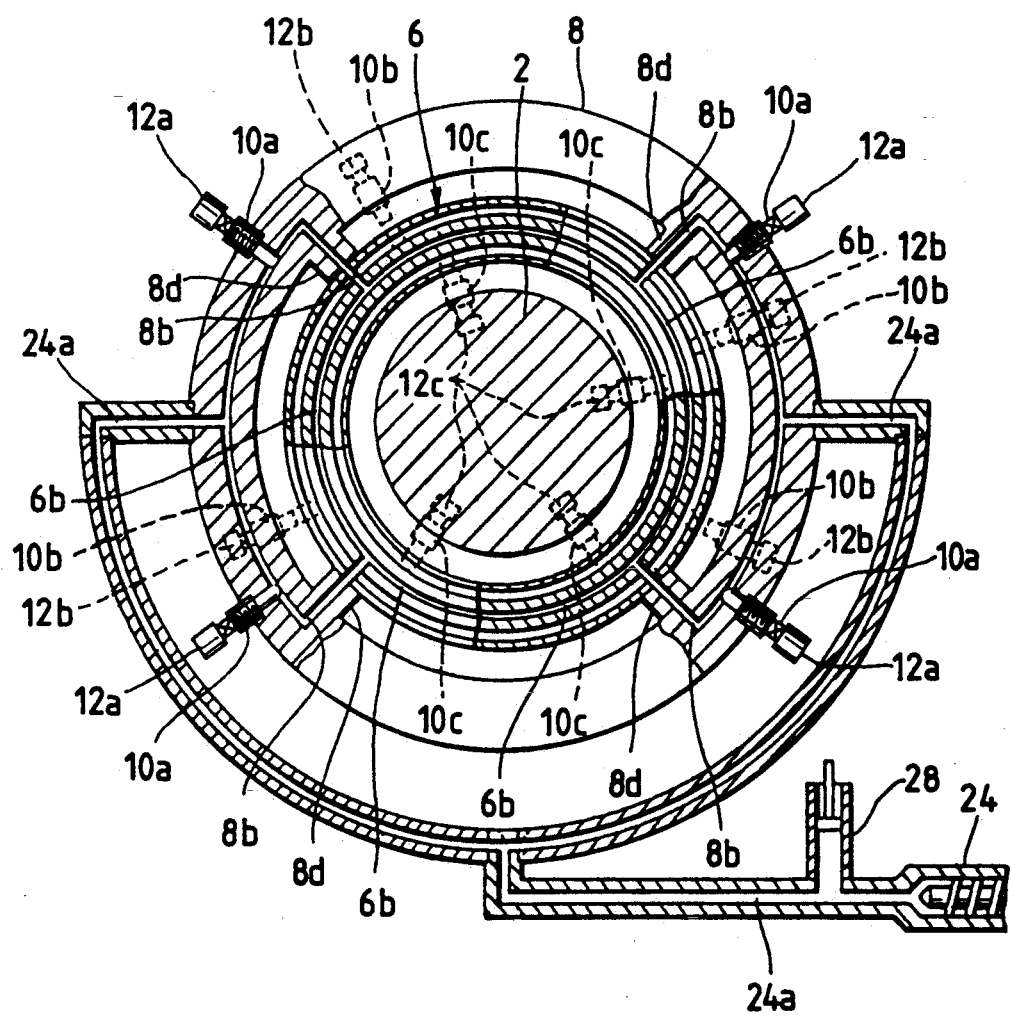
FIG. 2 is a cross-sectional view of the major portion to illustrate auxiliary resin flow routes.
Figure 3:
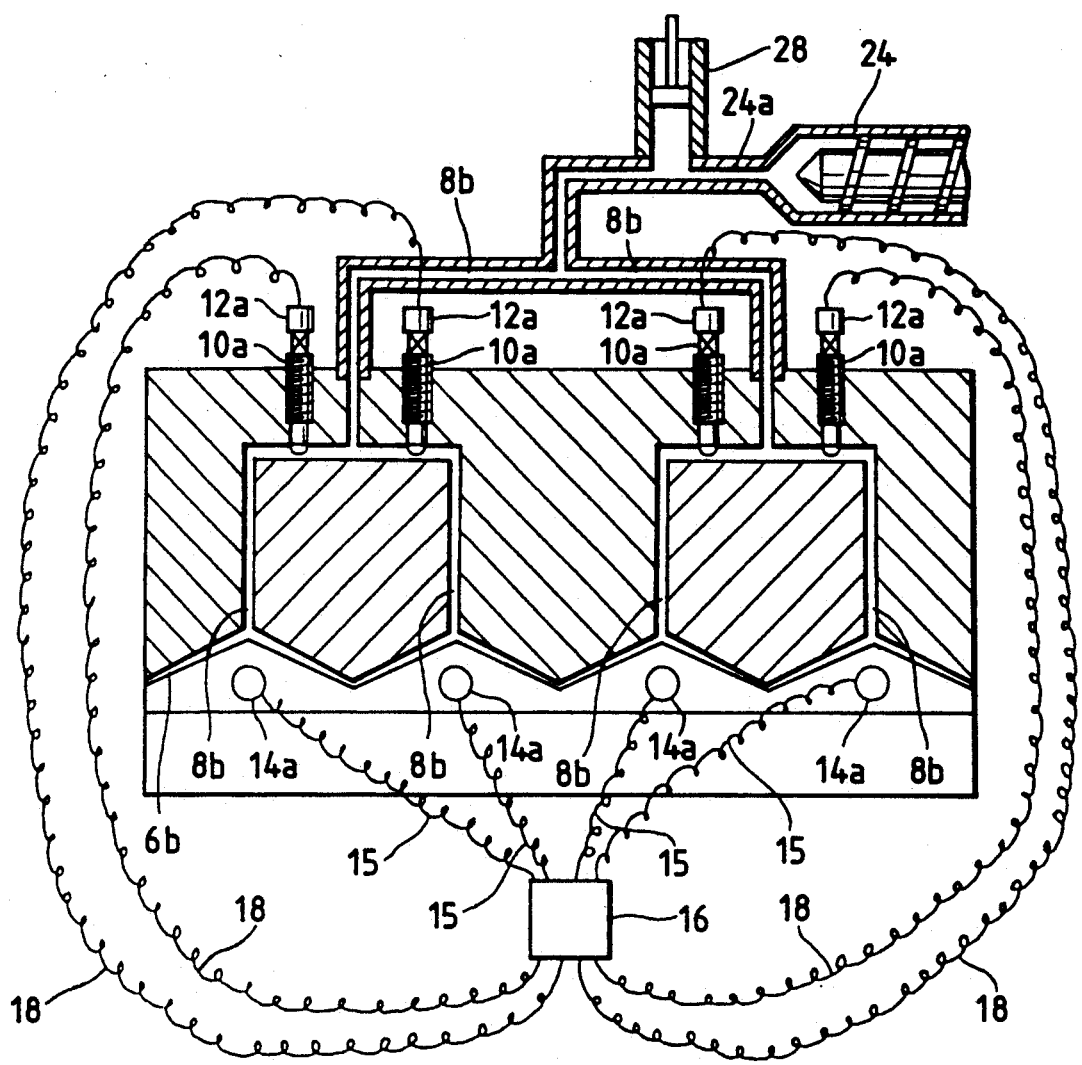
FIG. 3 is a schematic sectional view of the major portion taken along lines 3—3 in FIG. 1.

FIGS. 1, 2 and 3 illustrate a major portion of a blow molding machine for practicing the method of the present invention. The machine includes a cylinder 2, annular fluid passages 2e, 2f, 6a, 6b and 6c, an annular piston 4, a multilayer feed head 6, an annular outlet port 6d, a head ring 8, fluid passages 8a, 8b and 8c, four valves 10a, four valves 10b, four valves 10c, four drivers 12a, four drivers 12b, four drivers 12c, four pressure gauges 14a, four pressure gauges 14b, four pressure gauges 14c, four pressure gauges 14d, four pressure gauges 14e, signal transmission lines 15, a controller 16, signal transmission lines 18, a main resin extruder 22, an auxiliary resin extruder 24, an adhesive extruder 26, an auxiliary resin accumulator 28, adhesive accumulators 30a and 30b, a main resin accumulator 32, a rod 34, and a molding core 36.

The cylinder 2 has an annular opening 2a extending in the axial direction of the cylinder. The annular piston 4 is movably fitted in the opening 2a so that the cylinder 2 and the piston 4 constitute the main resin accumulator 32 in which a main resin, which is the main material of the multilayer parison 20, is stored. The rod 34 is provided in the center of the cylinder 2 so that the rod can be slid up and down in the cylinder. The lower end portion of the rod 34 is threadedly-engaged in the molding core 36 disposed at the bottom portion thereof. An annular slot 2b is defined between the lower end of the cylinder 2 and that of the core 36 so as to extrude the parison 20 through the slot. The rod 34 can be moved to displace the core 36 up or down relative to the cylinder 2 to modulate the width of the slot 2b and attendently the thickness of the parison 20.

The multilayer feed head 6 is ring-shaped, and is disposed inside the cylinder 2 between the annular piston 4 and the slot 2b in such a manner that the head does not contact the inner and outer circumferential sides of the cylindrical opening 2a of the cylinder. The head 6 is supported by the head ring 8, and has the three mutually concentric annular fluid passages 6a, 6b and 6c extending through the surface of the head, which faces the slot 2b. The annular fluid passages 6a, 6b and 6c constitute annular nozzles, respectively, and merge into the single annular outlet port 6d of the head 6 so that a plurality of materials described hereinafter are adjacent to each other as they are forced from the annular outlet port toward the slot 2b in forming the multilayer parison 20.

The three injectors 22, 24 and 26 are provided around the cylinder 2 for injecting the various resins as follows: The main resin extruder 22 is for accumulating the main resin as the main material of the multilayer parison 20 into the main resin accumulator 32; the auxiliary resin extruder 24 is for accumulating an auxiliary resin as the auxiliary material of the parison 20 into the auxiliary resin accumulator 28; and the adhesive extruder 26 is for accumulating an adhesive as the other material of the parison 20 into the adhesive accumulators 30a and 30b. The passage pipe 22a of the main resin extruder 22 communicates with an inlet port 2c provided in the circumferential portion of the cylinder 2 which has an opening 2d between the inlet port and the slot 2b. The opening 2d extends to the cylindrical opening 2a. The head ring 8 having the fluid passages 8a, 8b and 8c is fixedly fitted in the opening 2d. The annular fluid passage 6b is connected to the passage pipe 24a of the auxiliary resin extruder 24 through the fluid passages 8b. The auxiliary resin accumulator 28 communicates with the passage pipe 24a. The other annular fluid passages 6a and 6c are connected to the passage pipes 26a and 26b of the adhesive extruder 26 through the fluid passages 8a and 8c. The adhesive accumulators 30a and 30b communicate with the passage pipes 26a and 26b.

The multilayer feed head 6 is supported by the four support portions 8d of the head ring 8, which are located at equal angular intervals, as shown in FIG. 2. The fluid passages 8b of the ring 8 are provided at four equally spaced intervals around the annular fluid passage 6b of the feed head 6, extend through the support portions 8d, and are connected to the annular fluid passage 6b. The passage pipe 24a of the auxiliary resin extruder 24 has a semicircular intermediate portion communicating with the four fluid passages 8b. The four valves 10a are provided at equal angular intervals for the four fluid passages 8b and are coupled to the four drivers 12a, respectively, so that the valves can be opened and closed to change the cross-sectional areas of the passages. Similarly, the other valves 10b and 10c are provided at equal angular intervals for the other fluid passages 8a and 8c of the head ring 8 and are coupled to the other drivers 12b and 12c, respectively, so that the valves can be opened and closed to change the cross-sectional areas of these passages 8a and 8c. The valves 10a, 10b and 10c and the drivers 12a, 12b and 12c are the same in construction and operation.

The pressure gauges 14a are provided at equal angular intervals on the annular fluid passage 6b of the multilayer feed head 6 near the points of confluence of the passage with the fluid passages 8b, as shown in FIG. 3. Pressure signals are sent from the gauges 14a to the controller 16 through the signal transmission lines 15. The controller 16 can send out mutually-independent control signals to the drivers 12a through the other signal transmission lines 18. The other pressure gauges 14b and 14c are similarly provided at equal angular intervals on the other annular fluid passages 6a and 6c of the head 6, but only four of the gauges are shown in FIG. 1 Pressure signals are sent from the gauges 14b and 14c to the controller 16 as well. The controller 16 can send mutually independent control signals to the drivers 12b and 12c through the signal transmission lines 18 as well.

The method of controlling the extrusion of the multilayer parison 20 with the blow molding machine is now described in detail. The rotational frequency of the main resin extruder 22 is regulated so that a storage time from the start of the storage of the main resin in the main resin accumulator 32 to the end of the storage is preset. Also, the amount of time from the start of injection of the main resin from the main resin accumulator 32 to the end of the injection is preset. The valves 10a, 10b and 10c are set to the closed positions. The injectors 22, 24 and 26 are then driven so that the main resin, the auxiliary resin and the adhesive are respectively stored in the accumulators 32, 28, 30a and 30b. Thereafter, the valves 10a, 10b and 10c are set to the open position, and the accumulators 32, 28, 30a and 30b are driven to force the resins and the adhesive from the slot 2b to form the multilayer parison 20 as it is extruded from the cylinder 2. At that time, the manner in which the resins and the adhesive overlay one another to constitute the multilayer parison 20 is observed. If the resulting parison is acceptable, the timing of the start of the driving of the accumulators 32, 28, 32a and 32b is preset in order to simultaneously push out the main and the auxiliary resins, and the adhesive from the slot 2b. The preset timing is memorized in the controller 16. The pressure of the material in each of the annular fluid passages 6a, 6b, 6c, 2f and 2e during the extrusion is measured by the corresponding four pressure gauges 14a, 14b, 14c, 14d and 14e. The degree of opening of each of the valves 10a, 10b and 10c is regulated on the basis of the result of the measurement of the pressure so that the material in the corresponding annular fluid passage has nearly equal pressure at the four pressure gauges, and the pressure difference between the materials in every pair of the annular fluid passages is not more than about 5 kg/cm$^2$. The regulated degree of opening is stored in the memory of the controller 16. The manner in which the materials overlay one another at the end of the extrusion of the parison 20 is observed. The timing in which the valves 10a, 10b and 10c are set to the closed positions in order to ensure that the extrusion of the materials is simultaneously terminated is preset on the basis of the result of the observation, and stored in memory in the controller 16.

After that preparatory controlling operation, the normal extrusion of the multilayer parison 20 is started. To store the main and the auxiliary resins and the adhesive in the accumulators 32, 28, 30a and 30b, the controller 16 sends command signals to the drivers 12a, 12b and 12c, respectively, to place the valves 10a, 10b and 10c in the closed position. The main resin is injected from the main resin extruder 22 into the cylindrical opening 2a through the passage pipe 22a of the injector and the inlet port 2c of the cylinder 2 to force the annular piston 4 upwardly. The main resin is thus stored in the main resin accumulator 32. The auxiliary resin is injected from the auxiliary resin extruder 24 so that the resin is injected into the auxiliary resin accumulator 28 through the passage pipe 24a of the injector. The auxiliary resin is thus stored in the auxiliary resin accumulator 28. Since the valves 10a are in the closed position at that time, the pressure of the auxiliary resin does not act on the annular fluid passage 6b of the multilayer feed head 6. The adhesive is injected from the adhesive extruder 26 so that the adhesive is injected into the adhesive accumulators 30a and 30b through the passage pipes 26a and 26b of the injector. The adhesive is thus stored in the adhesive accumulators 30a and 30b. Since the valves 10b and 10c are in the closed position at that time, the pressure of the adhesive does not act on the annular fluid passages 6a and 6c of the head 6. Thus, the auxiliary resin and the adhesive are prevented from being extruded from the annular outlet port 6d of the head 6.

After the materials are stored in the accumulators 32, 28, 30a and 30b by the injectors 22, 24 and 26, the controller 16 sends a command signal to the drivers 12a, 12b and 12c to place the valves 10a, 10b and 10c at the opening position previously stored in memory. Thereafter, the controller sends out additional command signals to drive the pistons of the accumulators in the predetermined order and timing, to simultaneously force all the materials from the slot 2b. Specifically, the main resin flows through the innermost and outermost annular fluid passages 2e and 2f of the multilayer feed head 6 and is then forced from the passages; the auxiliary resin flows into the central annular fluid passage 6b of the head through the passage pipe 24a of the auxiliary resin extruder 24 and the fluid passages 8b of the head ring 8 and is then forced from the annular fluid passage; and the adhesive flows into the inner and outer annular fluid passages 6c and 6a of the head through the passage pipes 26b and 26a of the adhesive extruder 26 and the fluid passages 8c and 8a of the head ring and is then forced from the annular fluid passages, so that the auxiliary resin is interposed between the layers of the adhesive. Thereafter, the auxiliary resin and the adhesive are forced from the annular outlet port 6d so as to be interposed between the layers of the main resin. The multilayer parison 20 having outermost and innermost layers of the main resin, a central layer of the auxiliary resin and two intermediate layers of the adhesive is thus extruded from the slot 2b.

Figure 4:
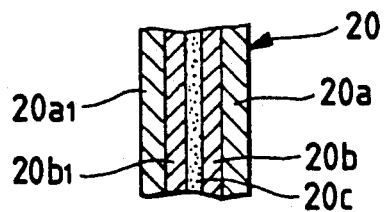
FIG. 4 is a partial sectional view of a multilayer parison extruded by the apparatus of the invention.
Figure 5:
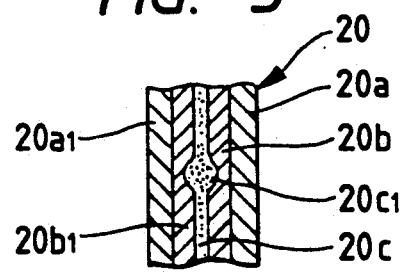
FIG. 5 is a partial sectional view of a multilayer parison extruded by a conventional extruder.

The parison 20 has a cylindrical form, and consists of the outermost layer 20a of the main resin, which is the first layer of the main resin; the outer intermediate layer 20b of the adhesive, which is the first layer of the adhesive; the central layer 20c of the auxiliary resin; the inner intermediate layer $20b_1$ of the adhesive, which is the second layer of the adhesive; and the innermost layer $20a_1$ of the main resin, which is the second layer of the main resin, as shown in FIG. 4. The layers are arranged in that order.

Through the above-mentioned regulation, the pressure of the auxiliary resin is preset to have substantially the same value at the pressure gauges 14a during the extrusion of the parison 20. However, if the pressures are not the same at the gauges 14a due to a change in the viscosity of the resin or the like during the extrusion, the controller 16 sends out a drive signal to at least one of the drivers 12a through the signal transmission line 18 to activate the appropriate driver so as to shift the corresponding valve 10a in a direction of opening or closing by a quantity indicated by the signal, so that the pressures are substantially the same at the gauges again. The thickness of the layer 20c of the auxiliary resin is thus kept uniform throughout the circumference of the layer. The thickness of each of the layers 20b and $20b_1$ of the adhesive is likewise maintained uniform throughout the circumference of the layer. If the degree of opening of at least one of the valves 10b and 10c for the adhesive has changed, the degrees of opening of all the valves are collectively readjusted together so that the difference between the pressure of the adhesive for the outer intermediate layer 20b and that of the adhesive for the inner intermediate layer $20b_1$ is kept within a prescribed range. For these reasons, the auxiliary resin and the adhesive are prevented from being terminated, forming the expansions, or the like.

The present invention is not confined to the above-described embodiment, but may be embodied or practiced in other various ways without departing from the scope or spirit of the invention.

What is claimed is:

1. A method of controlling the extrusion of a multilayer parison using an apparatus including three extruders respectively communicating with a main resin accumulator, an auxiliary resin accumulator and an adhesive accumulator, said main resin accumulator communicating with innermost and outermost annular fluid passages, said auxiliary resin accumulator communicating with a central annular fluid passage through auxiliary passageways, and said adhesive resin accumulator communicating with inner and outer intermediate annular passages being respectively disposed between said central annular fluid passage and said innermost and said outermost fluid passages, said method comprising the following steps:

closing said auxiliary and intermediate fluid passageways;

accumulating said main resin, said auxiliary resin and said adhesive respectively into said main resin accumulator, said auxiliary resin accumulator and said adhesive accumulator;

opening said auxiliary and intermediate passageways and injecting said main resin, said auxiliary resin and said adhesive from their respective accumulating chambers and into their respective fluid passages so that said main and auxiliary resins and said adhesive are extruded from their respective fluid passages;

determining the pressures of said resins and said adhesive in said fluid passages;

controlling the degree of opening of said auxiliary and adhesive passageways based on the determined pressures such that the pressure difference between said determined pressures is below a preset value; and terminating the injection of said main resin from said main resin accumulator and closing said auxiliary and adhesive passageways so that the extrusion of said main resin, the auxiliary resin and the adhesive are terminated.

2. The method of claim 1, wherein said steps of opening and closing said auxiliary passageways includes the step of closing valves provided in said passageways.

3. The method of claim 1, wherein the order and timing of opening said auxiliary and intermediate passageways is stored in memory means.

4. The method of claim 1, wherein said preset value is approximately 5 kg/cm$^2$.

5. The method of claim 1, further comprising the step of storing the sequence and timing in which said auxiliary and intermediate passageways are opened and closed such that said main and auxiliary resins and said adhesive are simultaneously extruded from their respective passages and such that the extrusion of said main and auxiliary resins and adhesive is simultaneously terminated, wherein said opening step opens said auxiliary and intermediate passageways in said preset sequence and timing and wherein said terminating steps terminates the injection of said main resin and closes said auxiliary adhesive passages in said predetermined sequence and timing.

6. A multilayer parison extrusion apparatus, comprising:

three extruders respectively communicating with a main resin accumulator, an auxiliary resin accumulator and an adhesive accumulator, said main resin accumulator communicating with innermost and outermost annular fluid passages, said auxiliary resin accumulator communicating with a central annular fluid passage through an auxiliary passage, and said adhesive resin accumulator communicating through an adhesive passage with inner and outer intermediate annular fluid passages being respectively disposed between said central annular fluid passage and said innermost and said outermost fluid passages;

pressure detecting means respectively provided in said innermost annular fluid passage, said outermost annular fluid passage, said central annular fluid passage, and said intermediate annular passages for detecting pressures of a main resin, an auxiliary resin and an adhesive resin in respective annular fluid passages; and valve means respectively provided in said auxiliary passage and said adhesive passage for opening and closing said auxiliary and adhesive passages, and controlling the degree of opening of said auxiliary and adhesive passageways based on the detected pressures such that the pressure difference between said detected pressures is below a present value.

* * * * *